United States Patent
Rosu et al.

(10) Patent No.: US 7,577,759 B2
(45) Date of Patent: Aug. 18, 2009

(54) METHOD AND APPARATUS FOR IN-KERNEL APPLICATION-SPECIFIC PROCESSING OF CONTENT STREAMS

(75) Inventors: Daniela Rosu, Ossining, NY (US); Marcel C. Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 11/069,153

(22) Filed: Mar. 1, 2005

(65) Prior Publication Data

US 2006/0209731 A1 Sep. 21, 2006

(51) Int. Cl.
G06F 15/16 (2006.01)
(52) U.S. Cl. ...................................... 709/250
(58) Field of Classification Search ................. 709/202, 709/212, 246, 250; 719/319; 370/299; 710/20
See application file for complete search history.

(56) References Cited

U.S. PATENT DOCUMENTS

| | | | | |
|---|---|---|---|---|
| 5,941,988 | A * | 8/1999 | Bhagwat et al. | 726/12 |
| 6,067,576 | A * | 5/2000 | Berranger et al. | 719/321 |
| 6,098,112 | A * | 8/2000 | Ishijima et al. | 719/321 |
| 6,108,695 | A * | 8/2000 | Chawla | 709/217 |
| 6,216,173 | B1 * | 4/2001 | Jones et al. | 715/705 |
| 7,136,935 | B2 * | 11/2006 | Rao | 709/250 |
| 7,230,978 | B2 * | 6/2007 | Bitterlich et al. | 375/219 |
| 2002/0078135 | A1 | 6/2002 | Venkatsubra | |
| 2003/0190054 | A1 * | 10/2003 | Troyansky et al. | 382/100 |

OTHER PUBLICATIONS

Vimal, Khanna K, Approaches to Improving Performance of Streams-Based Protocol Stacks, Feb. 2000, IEEE Communications Magazine, p. 164-171.*
RFC 2327, Session Description Protocol, by M. Handley and V. Jacobson, published by IETF Network Working Group, Apr. 1998.
A Case for End System Multicast, by Y. Chu, S. Rao, S. Seshan, H. Zhang, published in ACM SIGCOMM 2000.
End-System Optimizations for High-Speed TCP, by J. Chase, A. Gallatin, K. Yocum, published in IEEE Communications, 39(4), Apr. 2001.
Exploiting In-Kernel Data Paths to Improve I/O Throughput and CPU Availability, by K. Fall, J. Pasquale, published in USENIX Winter Conference, 1993.
A Comparison of Mechanisms for Improving TCP Performance Over Wireless Links, by H. Balakrishnan, V. Padmanabhan, S. Seshan, R. Katz, published in ACM SIGCOMM Conference, 1996.

(Continued)

*Primary Examiner*—Andrew Caldwell
*Assistant Examiner*—Jason Recek
(74) *Attorney, Agent, or Firm*—Ference & Associates LLC

(57) ABSTRACT

Transferring content between one or more input streams and one or more output streams via an application running on a host system. A kernel-level service is provided which is adapted to perform application-specific processing and which attends to transfer of content from at least one input stream to at least one output stream. With the kernel-level service, an operation is performed for the collection of at least one input stream and at least one output stream via: performing application-specific processing; and attending to the transfer of content from at least one input stream to at least one output stream.

21 Claims, 2 Drawing Sheets

OTHER PUBLICATIONS

MSOCKS: An Architecture for Transport Layer Mobility, by D. Maltz, P. Bhagwat, published in INFOCOM, 1998.

Kernel Support for Faster Web Proxies, by M. C. Rosu, D. Rosu, published in USENIX Annual Technical Conference, 2003.

Extensibility, Safety and Performance in the SPIN Operating System, by B. Bershad, S. Savage, P. Pardyak, E. Sirer, D. Backer, M. Fiuczynski, C. Chambers, S. Eggers, published in the ACM Symposium on Operating System Principles, 1995.

* cited by examiner

METHOD AND APPARATUS FOR IN-KERNEL APPLICATION-SPECIFIC PROCESSING OF CONTENT STREAMS

FIELD OF THE INVENTION

The present invention relates generally to a method and apparatus for improving the operation of an application that transfers content between a set of incoming and outgoing streams while it applies simple content processing.

BACKGROUND OF THE INVENTION

The current Internet computing environment includes numerous instances of applications that transfer content between one or more incoming streams and one or more output streams, and that apply limited application-specific processing to the input content. In the area of Web serving, sample applications include HTTP Server and Proxy applications. HTTP Server applications, such as Apache, transfer dynamic content with non-apriori-known length received from Application Servers, such as IBM WebSphere, or from CGI scripts, to persistent client connections, and process the input stream only to remove the markup specific to the input stream, if any, and to add the markup for chunked encoding. Similarly, HTTP Proxy applications, like Squid, transfer content in chunked encoding received from HTTP Servers to non-persistent client connections, and process the content to remove the chunked encoding markup before sending it on the client connection and loading it into the cache.

In the area of multimedia serving, Media Server products from Microsoft or RealNetworks combine multiple media streams into a single stream, by adding encapsulation headers to each block of an input stream. For instance, the RFC 2327, "Session Description Protocol", by M. Handley and V. Jacobson, published by IETF Network Working Group, April 1998, describes a protocol used for this type of media stream transmission.

In the area of distributed interactive applications with implementations employing application-level multicast, content is transferred from one or more input streams to one or more output streams, such as described in "A Case for End System Multicast", by Y. Chu, S. Rao, S. Seshan, H. Zhang, published in ACM SIGCOMM, 2000. Depending on the routing method, per-packet processing is minimal, involving at most the rewriting of the application-specific header.

Numerous studies on TCP and server performance, including "End-System Optimizations for High-Speed TCP", by J. Chase, A. Gallatin, K. Yocum, published in IEEE Communications, 39(4), April 2001, demonstrate that the achievable transfer bandwidths are limited by the overhead of copying data between kernel- and user-space buffers.

Known methods and apparatuses for efficient content transfers between incoming and outgoing streams demonstrate that by eliminating the data copy between kernel- and user-space buffers can produce significant performance benefits.

For instance, work described in "Exploiting In-Kernel Data Paths to Improve I/O Throughput and CPU Availability", by K. Fall, J. Pasquale, published in USENIX Winter Conference, 1993, proposes in-kernel splicing mechanisms between data streams produced by devices/files and sockets. Namely, the mechanism allows an application to indicate one source and one destination file descriptor, and an amount of content for which a kernel-level service will perform the transfer, asynchronously. The proposal does not address data transfers between two TCP connections, which is a common scenario for Web servers and Media servers.

In-kernel splicing of TCP connections has been proposed, as well. For instance, in "A Comparison of Mechanisms for Improving TCP Performance over Wireless Links", by H. Balakrishnan, V. Padmanabhan, S. Seshan, R. Katz, published in ACM SIGCOMM Conference, 1996, describes a mechanism that transfers content between two TCP connections, but the service is not accessible to applications to use for offloading their transfers.

Also known are several proposals for mechanisms that are accessible to applications for offloading their transfers. The proposals differ in the extent to which applications can control the length, directionality, and payload caching of the transfers. For instance, the paper "MSOCKS: An Architecture for Transport Layer Mobility", by D. Maltz, P. Bhagwat, published in INFOCOM, 1998, enables unidirectional transfers, only in destination streams without prior activity, terminated by the close of the source stream. US Patent Application 20020078135 "Method and apparatus for improving the operation of an application layer proxy" extends the service model to permit transfer offloading for destination streams with prior activity. Finally, the paper "Kernel Support for Faster Web Proxies", by M. C. Rosu, D. Rosu, published in USENIX Annual Technical Conference, 1993, further extends the service to permit bidirectional transfers, with specified content length, decoupled connection termination, and payload caching. Applications like Web servers and Media servers can use these mechanisms to offload into the kernel all of their data transfers that do not require content modifications. As a result they can achieve significant performance benefits. In experiments with Web Proxy Server workloads, kernel-level offloading can reduce up to 50% the CPU overheads.

However, in prior-art arrangements, applications cannot offload into the kernel the data transfers which require any degree of content transformation. Applications must handle these transfers by reading the content from input streams at user level, applying the transformation, and writing the content to output streams. In this process, applications perform a large number of system calls and data copy operations between application and kernel spaces, which incur a large CPU overhead. Due to the application-specific processing that has to be applied to each packet or group of packets, such applications cannot benefit from conventional mechanisms when it comes to offloading these transfers at kernel level.

Conventional arrangements, as such, include mechanisms for loading and executing application-specific procedures in kernel context. For instance, an infrastructure that "allows applications to specialize the underlying operating system in order to achieve a particular level of performance and function" is described in "Extensibility, Safety and Performance in the SPIN Operating System", by B. Bershad, S. Savage, P. Pardyak, E. Sirer, D. Backer, M. Fiuczynski, C. Chambers, S. Eggers, published in the ACM Symposium on Operating System Principles, 1995. Similarly, modern operating systems, such as Linux, provide mechanisms for application-specific customization of various event handlers, including those related to data streams. However, prior art addressing specifically the area of data stream manipulation, is not addressing the selective customization of the processing along with the coupling of input and output streams.

In view of the foregoing, a need has been recognized in connection with providing an apparatus that allows applications to offload to kernel space both content transfers and simple content processing.

SUMMARY OF THE INVENTION

In view of the foregoing, at least one presently preferred embodiment of the present invention is directed at server applications that handle the transfer and processing of content received on one or more input streams and sent to one or more output streams; the content processing is application-specific. Broadly contemplated herein are a method and an apparatus that these applications can exploit to offload these content transformations and transfers at kernel level.

A method in accordance with at least one embodiment of the present invention involves having an application register with a kernel module one or more content processing procedures that can be executed in kernel space, and whose input and output include collections of memory buffers. For each input buffer, the procedure can produce zero, one, or more than one output buffers. The method also involves having an application issue requests for kernel level offloading of a content transfer, where each request indicates the set of input and output streams, the pre-registered procedure to be invoked for each input stream, the set of application-specific processing parameters to each input stream, the type of transfer termination, the content caching requirements, and the type of interaction (i.e., synchronous or asynchronous).

An apparatus in accordance with at least one embodiment of the present invention includes a kernel service that performs content transfers from a set of input streams to a set of output streams. The service provides an API that applications can use to register with the service one or more specific content processing procedures. Also, the service provides an API that applications can use to submit requests for processing/transfer offloads.

By virtue of at least one embodiment of the present invention, the number of I/O system calls is reduced, as is the amount of data copy between kernel and user space incurred with handling content transfers between input and output streams with application-specific processing. Among the very favorable results is significant CPU overhead reductions and server capacity increases.

It is believed that the inventive features contemplated herein can allow applications like Apache Web Servers and Media Servers to significantly reduce their CPU utilization consumed with stream processing by at least 20-30%, thus increasing the number of concurrent streams that a server system can handle.

In summary, one aspect of the invention provides a method for transferring content between one or more input streams and one or more output streams via an application running on a host system, said method comprising the steps of: providing a kernel-level service which is adapted to perform application-specific processing and which attends to transfer of content from at least one input stream to at least one output stream; and performing, with the kernel-level service, an operation for the collection of at least one input stream and at least one output stream via: performing application-specific processing; and attending to the transfer of content from at least one input stream to at least one output stream.

Another aspect of the invention provides an apparatus for transferring content between one or more input streams and one or more output streams via an application running on a host system, the apparatus comprising: a kernel-level service which is adapted to perform application-specific processing and which attends to transfer of content from at least one input stream to at least one output stream; and the kernel-level service being adapted to perform an operation for the collection of at least one input stream and at least one output stream via: performing application-specific processing; and attending to the transfer of content from at least one input stream to at least one output stream.

Furthermore, an additional aspect of the invention provides a program storage device readable by machine, tangibly embodying a program of instructions executed by the machine to perform method steps for transferring content between one or more input streams and one or more output streams via an application running on a host system, the method comprising the steps of: providing a kernel-level service which is adapted to perform application-specific processing and which attends to transfer of content from at least one input stream to at least one output stream; and performing, with the kernel-level service, an operation for the collection of at least one input stream and at least one output stream via: performing application-specific processing; and attending to the transfer of content from at least one input stream to at least one output stream.

For a better understanding of the present invention, together with other and further features and advantages thereof, reference is made to the following description, taken in conjunction with the accompanying drawings, and the scope of the invention will be pointed out in the appended claims.

DESCRIPTION OF PREFERRED EMBODIMENTS

Figure 1:
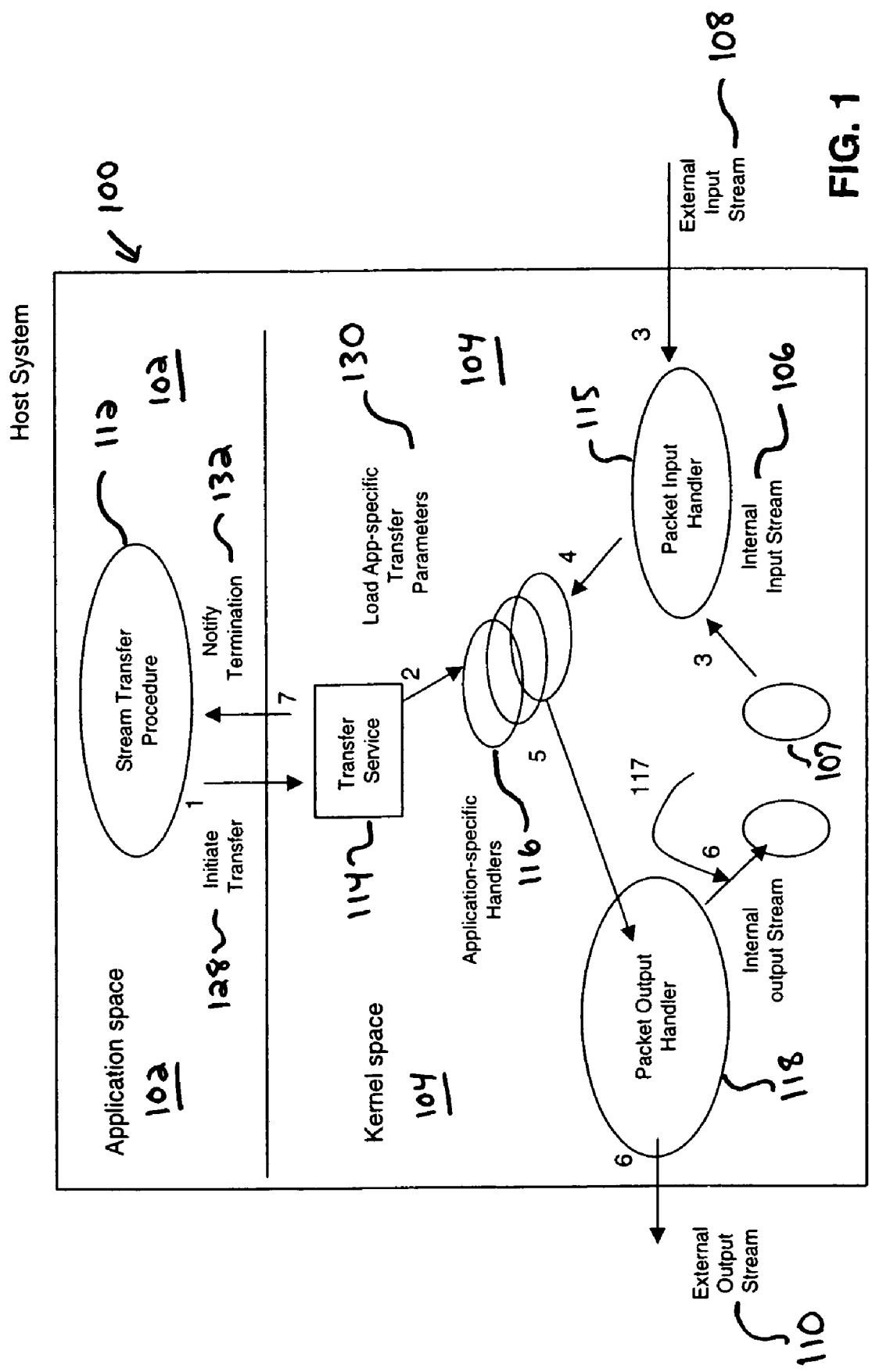
FIG. 1 is a schematic representation of the components and interactions related to the apparatus for kernel-level offloading of stream transfer and processing

Referring to FIG. 1, an embodiment of an apparatus for kernel-level processing and transfer of one or more input streams onto one or more output streams is illustrated.

As shown, host system 100 is divided into application space 102 and kernel space 104. The application running on the host system 100 receives input from one or more streams which it has to transfer into one or more output streams. An "internal" input stream 106 can originate from local components, such as from a disk or file system (107). Also, an "external" input stream 108 can originate from external components, such as object caches running on other systems. Similarly, an output stream can be "internal" (117), destined to a local component 107 or "external" 110. destined to an external component. When multiple output streams are involved, identical content is usually transmitted on each stream.

The content sent on the output connections is the result of the processing of the input content by some application-specific procedure 112. For instance, for a Web Server receiving content from a CGI script and sending it on a persistent HTTP connection, the processing involves the following. Each chunk of content that is read from the input stream is encapsulated in chunked-encoding markup, which includes a header that indicates the size of the encapsulated content, and a termination that indicates the end of the chunk.

In order to perform this transfer, the application uses a kernel-level service, which can be referred to as "Transfer Service" 114, which performs content transfers and the necessary application-specific processing within the kernel address space. The Transfer Service 114 controls the flow of data buffers from the input streams (as received via the packet input handler associated with the input stream(s) 115), invokes application-specific handlers 116 to execute the processing, and attaches the data buffers produced by these handlers to the outgoing output streams to be transmitted via the packet output handlers associated with these streams (118).

Figure 2:
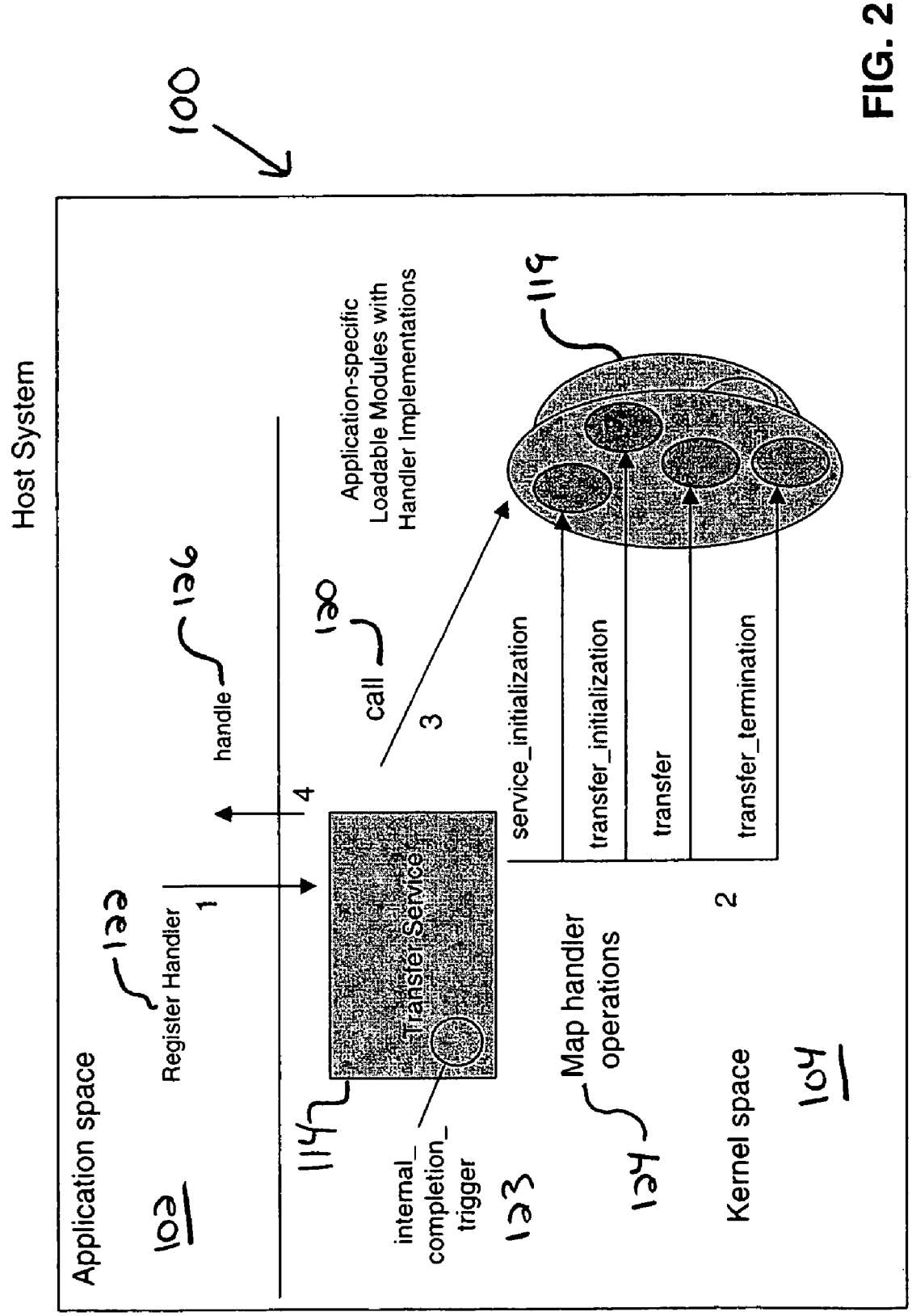
FIG. 2 is a schematic representation of the steps involved in the registration process of application-specific handler.

Referring to FIG. 2, the application preferably registers a handler with the Transfer Service 114 prior to issuing a Transfer Service request that employs that particular handler for processing input streams. The handler registration is a two-step process. First, a module 119 that contains the handler is loaded in the kernel as a loadable kernel module; the module can contain one or more handlers. Second, the application invokes the Transfer Service 114 to perform handler registration (122). This is performed as a system call, with parameters that indicate the references to the procedures implementing the handler operations, a set of parameters to be passed to the handler, and processing indications. The processing indications may include information on whether the handler executes its processing asynchronously, in a dedicated kernel thread, or synchronously, in the same thread as its caller procedure. The Transfer Service 114 creates a local descriptor for the handler (124). This descriptor includes the kernel-space references to the procedures that implement the handler operations. The Transfer Service invokes the "initialization" operation of the handler (120), passing the parameters defined in the application call, if any.

Finally, the Transfer Service returns to the application a handle 126 that the application can use in subsequent requests.

The set of handler operations preferably includes service_initialization, transfer_initialization, transfer, and transfer_termination with the following:

int service_initialization(void* application-defined-parameters), where the return value is non-negative if the procedure executed correctly, and negative if the procedure failed and the handler cannot be used for processing any content transfers;

int transfer_initialization(void* inputStreamIdentifier, void* application-defined-parameters), where the return value is non-negative if the procedure executed correctly, and negative if the procedure failed and the handler cannot be used for processing the particular content transfer, DataBufferDescriptorList transfer(void* inputStreamIdentifier), where the return value is the list of buffers that should be placed in the output queues of the output streams (the list can contain any number of buffer items, including none; the procedure is expected to retrieve input buffers from the inputStream, and use operating system-specific procedures to manipulate and allocate data buffers); and DataBufferDescriptorList transfer_termination(void* inputStreamIdentifier), where the return is the list of buffers that should be placed in the output queues of the output streams; the list can contain any number of buffer items, including none.

For an implementation in the Linux operating system, the inputStreamIdentifier is preferably a socket data structure, a data buffer is an sk_buff data structure, and DataBufferDescriptorList is an sk_buff data structure representing the head of the list.

Referring again to FIG. 1, the interaction between application and the kernel-level service for performing content transfer is described herebelow.

The application-level "stream transfer procedure" 112, performs a system call directed to the Transfer Service to initiate the transfer (128). The call parameters preferably include the following pieces of information: set of input file descriptors, set of output file descriptors, identification of which of the loaded application-specific handlers should be invoked for each of the input streams, which processing parameters are be used by the application-specific handlers for each of the streams, how the service to proceed if any input stream is terminated, how the service to proceed if any output stream is terminated, type of synchronicity of the transfer, and options for collecting transfer statistics.

The Transfer Service 114 creates a descriptor for the request, associates with each stream the appropriate packet handlers, and initializes the application-specific handlers, by calling their transfer_initialization procedure and providing the corresponding processing parameters, if any (130). If the type of synchronicity is synchronous, the request call doesn't return until the transfer is completed. However, if the type of synchronicity is asynchronous, the service returns immediately to the application; at a later time, the application checks the completion of the transfer by checking the availability of input from one of the input streams; for instance, from the first stream on the input list. During the transfer, preferably, the application will not be permitted to read from the input streams and write to the output streams.

Related to the association of packet handlers with input streams, the Transfer Service 114 identifies the type of the stream, and replaces the original handler for processing input packets with a Transfer Service-specific handler. This handler calls the appropriate application-specific handler upon completing the work of the original handler. For instance, for a TCP stream, the handlers replaced by the Transfer Service are the event handlers of associated socket, namely, the socket's data_ready, write_space, error_report, and state_change.

The Transfer Service 114 preferably includes a function 123, called internal_completion_trigger (see FIG. 2), that the application-specific handler can call to indicate the completion of the transfer when completion is determined based on the stream content rather than data-stream signals.

At runtime, when data buffers are received in a stream, the Transfer Service 114 specific handler preferably invokes the transfer operation of the application-specific handler associated with the stream. For TCP streams, the Transfer Services specific handle is the one corresponding to the socket's data_ready handle. The list of buffers returned by this operation is attached to the output queue of all of the output streams.

When the Transfer Service 114 determines that no more content is expected from an input stream, it invokes the transfer_termination operation of the corresponding handler. For TCP streams, this may be triggered by the invocation of the socket's error_report or state_change handlers.

When the termination condition is satisfied, the Transfer Service 114 may collect transfer statistics, and notifies the application about the completion (132). The termination condition is defined as follows: The transfer is terminated when a close or abort is detected on an input or output stream for which the application indicated that it should trigger the termination of the entire transfer. Otherwise, the transfer is terminated when all of the input streams are closed or aborted.

The application can preferably be notified of completion by (1) return from the system call, for synchronous transfers, or by (2) signaling input event for the first input stream in the list, for asynchronous transfers. If statistics collection was requested, for synchronous transfer, the data returned by the system call includes these statistics. For asynchronous transfer, the transfer statistics can be retrieved by a subsequent system call.

The Apache Web Server application can use the Transfer Service 114 as follows. The service can be used for content that is received from CGI scripts and Application Servers.

Apache can register several types of application-specific handlers. One type is used for handling data streams from CGI scripts that are destined to persistent HTTP/1.1 client connections. For this type of transfer, chunked encoding is used to keep alive the client connection, and thus lower the response times for subsequent requests from the same client. The application-specific handler determines the size of an input segment and attaches the chunked encoding header and trailer markup. The header can be transmitted as a standalone packet, or it can be attached to the end of the preceding packet, if buffer space is available. The trailer can be attached at the end of the last buffer of the current segment or it can be allocated as a standalone packet.

Another type of Apache handler is used for streams received from Application Server via specific connectors and which are forwarded on HTTP/1.0 connections. This handler has to remove the connector header, which indicates the size of the actual payload. The connector header can be removed just by changing the start pointer of the buffer to point to the first byte of the payload. The handler invokes the Transfer Service's handler for internal_completion_trigger to indicate the termination of the transfer when the connector header indicates it.

Finally, another type of Apache handler is used for streams received from Application Server via specific connectors and which are forwarded on HTTP/1.1 connections. This handler has to remove the connector header and insert chunked-encoding markup. This is implemented by combining the functionality of the two handlers described previously.

The handlers that perform chunked encoding can be configured by transfer-specific parameters with respect to the minimum size of the chunked block they should produce. With this parameter, the handlers might postpone forwarding buffers on the output stream until enough content is collected in the input queue or until the input stream is terminated. One possibility is to set the chunk size to a multiple of packet payload size.

In order to use these handlers, in the initialization stage of Apache, the application registers the three types of handlers with the Transfer Service 114. At runtime, when in the application-level procedures for handling input streams from CGI scripts and Application Servers, an Apache thread processing a client request performs the following steps. First, it reads the first segment of the input stream, which includes HTTP headers and, possibly some content. Second, it produces the output HTTP headers, and it forwards them on the output stream along with the first chunk of content. Third, the Apache thread issues a synchronous Transfer Service request, with the set of input streams comprising the CGI or Application Server content stream, and with the set output streams comprising the client connection. The input stream is associated one of the registered handlers, according to the type of the input and output streams. The termination condition is the termination of the input stream. For HTTP1.1 client connections, the request includes the specification of a transfer-specific parameter for the handler that describes the minim chunk size. When the control returns to the user level, the Apache thread can check transfer statistics and proceed to process a new request in the same client connection, if any.

A media server can use the Transfer Service 114 as follows. The service can be used to combine multiple input media streams into a single stream destined to a media-consumer application, such as a user-facing application like a media player or a proxy application that performs store-and-forward operations.

The application can register with the Transfer Service 114 a handler that attaches to each block of input appropriate encapsulation headers. The content in each header depends on the type of the input stream and the characteristics of the media content end-user. The header content to be applied to each input stream is described by the per-stream parameters provided by the application at the time of initiating the transfer.

It is to be understood that the present invention, in accordance with at least one presently preferred embodiment, includes a kernel-level service which is adapted to perform application-specific processing and which attends to transfer of content from at least one input stream to at least one output stream. This may be implemented on at least one general-purpose computer running suitable software programs. They may also be implemented on at least one integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirely herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for transferring data content between one or more input streams and one or more output streams controlled by an application running on a host system, said method comprising the steps of:

provide an operating system kernel-level transfer service which is adapted to perform application-specific processing of data content and which attends to transfer of content from at least one input stream to at least one output stream; and performing, with the operating system kernel-level transfer service, an operation for collection of at least one input stream and at least one output stream via:

performing application-specific processing, wherein said application-specific processing comprises modifying the data content via modifying a packet payload; and attending to the transfer of content from at least one input stream to at least one output stream;

wherein the at least one input stream and the at least one output stream are external to the application;

wherein said operating system kernel-level transfer service is provided in response to a request for an operating system kernel level offloading of a content transfer and the request indicates a set of input and output streams, a pre-registered procedure to be invoked for each input stream, a set of application-specific processing parameters to each input stream, a type of transfer termination, content caching requirements, and whether interaction is synchronous or asynchronous.

2. The method according to claim 1, wherein the request further indicates a set of input file descriptors, a set of output file descriptors, an identification of application-specific handlers to be invoked for each input stream, an identification of processing parameters to be used by application-specific handlers for each input stream, an indication of how the operating system kernel-level transfer service is to proceed if any input stream is terminated, an indication of how the operating system kernel-level transfer service is to proceed if any output stream is terminated, and options for collecting transfer statistics.

3. The method according to claim 1, further comprising the step of employing the operating system kernel-level transfer service to provide feedback on at least one of the states of the content transfer and of the content processing to the application when the transfer and processing transition into predetermined states or upon application request.

4. The method according to claim 1, further comprising the steps of:
registering application-specific content handlers with the operating system kernel-level transfer service prior to initiating transfer;
wherein said step of performing application-specific processing of input content comprises employing the registered application-specific content handlers.

5. The method according to claim 1, wherein said step of performing application-specific processing comprises at least one of:
performing different procedures for different streams; and
utilizing different configuration parameters for different streams;
wherein said modifying the packet payload comprises modifying data content other than a header.

6. The method according to claim 1, wherein said step of performing application-specific processing involves at least one of:
some content segments of an input stream being dropped;
some content segments of an input stream being modified, wherein being modified further comprises adding or removing chunked-encoding markup, and
some content segments not contained in any input stream being transferred to the output streams.

7. The method according to claim 1, further comprising the step of varying the number of streams subsequent to initiating the said content processing and said content transfer.

8. The method according to claim 1, wherein during the said transfer of content the application indicates how the transfer is to proceed in the event that a stream-state change occurs on one or more input or output streams.

9. The method according to claim 1, wherein:
the application handles web content.

10. The method according to claim 9, wherein:
at least one input stream and at least one output stream differ in encoding characteristics; and
said step of performing application-specific processing comprises translating between specific encoding characteristics of at least one input stream and at least one output stream such that end-user application-specific processing is accomplished.

11. The method according to claim 1, wherein:
the application handles media content;
the said at least one input stream includes at least one stream produced by a media source;
said step of performing application-specific processing comprises adding content markers to customize at least one output stream to capabilities of a media consumer.

12. An apparatus for transferring data content between one or more input streams and one or more output streams controlled by an application running on a host system, the apparatus comprising:
a processor;
an operating system kernel-level transfer service which is adapted to perform application-specific processing of data content and which attends to transfer of content from at least one input stream to at least one output stream; and
an arrangement for performing, with the operating system kernel-level transfer service, an operation for the collection of at least one input stream and at least one output stream via:
performing application-specific processing utilizing the processor, wherein said application-specific processing comprises modifying the data content via modifying a packet payload; and
attending to the transfer of content from at least one input stream to at least one output stream;
wherein the at least one input stream and the at least one output stream are external to the application;
wherein said operating system kernel-level transfer service is further adapted to be provided in response to a request for an operating system kernel level offloading of a content transfer indicating a set of input and output streams, a pre-registered procedure to be invoked for each input stream, a set of application-specific processing parameters to each input stream, a type of transfer termination, content caching requirements, and whether interaction is synchronous or asynchronous.

13. The apparatus according to claim 12 wherein the arrangement for providing an operating system kernel-level transfer service is adapted to provide feedback on at least one of the states of the content transfer and of the content processing to the application when the transfer and processing reaches a predetermined state or upon application request.

14. The apparatus according to claim 12 wherein:
the arrangement for providing an operating system kernel-level transfer service is adapted to register application-specific content handlers prior to initiating transfer;
wherein said arrangement for performing application-specific processing of input content is adapted to employ the registered application-specific content handlers.

15. The apparatus according to claim 12, wherein said arrangement for performing application-specific processing comprises at least one of:
an arrangement for performing different procedures for different streams; and
an arrangement for utilizing different configuration parameters for different streams;
wherein said arrangement for performing an operation for the collection of at least one input stream and at least one output stream further comprises performing application-specific processing via modifying the data content other than a header.

16. The apparatus according to claim 12, wherein said arrangement for performing application-specific processing is adapted to involve at least one of:
some content segments of an input stream being dropped;
some content segments of an input stream being modified, wherein being modified further comprises adding or removing chunked-encoding markup, and
some content segments not contained in any input stream being transferred to the output streams.

17. The apparatus according to claim 12, wherein the arrangement providing an operating system kernel level transfer service is adapted to, during the said transfer of content, receive instruction from the application indicating how the transfer is to proceed in the event that a stream-state change occurs on one or more input or output streams.

18. The apparatus according to claim 12, wherein:
the application handles web content.

19. The apparatus according to claim 18, wherein:

at least one input stream and at least one output stream differ in encoding characteristics; and said arrangement for performing application-specific processing is adapted to translate between specific encoding characteristics of at least one input stream and at least one output stream such that end-user application-specific processing is accomplished.

20. The apparatus according to claim 12, wherein:

the application handles media content;

the said at least one input stream includes at least one stream produced by a media source;

said arrangement for performing application-specific processing is adapted to add content markers to customize at least one output stream to capabilities of a media consumer.

21. A program storage device readable by machine, tangibly embodying a program of instructions executed by the machine to perform method steps for transferring content between one or more input streams and one or more output streams controlled by an application running on a host system, said method comprising the steps of:

providing an operating system kernel-level transfer service which is adapted to perform application-specific processing of data content and which attends to transfer of content from at least one input stream to at least one output stream; and performing, with the operating system kernel-level transfer service, an operation for the collection of at least one input stream and at least one output stream via:

performing application-specific processing, wherein said application-specific processing comprises modifying the data content via modifying a packet payload; and attending to the transfer of content from at least one input stream to at least one output stream;

wherein the at least one input stream and the at least one output stream are external to the application;

wherein said operating system kernel-level transfer service is provided in response to a request for an operating system kernel level offloading of a content transfer and the request indicates a set of input and output streams, a pre-registered procedure to be invoked for each input stream, a set of application-specific processing parameters to each input stream, a type of transfer termination, content caching requirements, and whether interaction is synchronous or asynchronous.

* * * * *